(12) United States Patent
Whitehurst et al.

(10) Patent No.: US 9,640,088 B1
(45) Date of Patent: May 2, 2017

(54) ELECTRONIC TAG TRANSMISSIONS OF CUSTOM-ORDER NUTRITIONAL INFORMATION

(71) Applicant: Apple Inc., Cupertino, CA (US)

(72) Inventors: Todd Whitehurst, Cupertino, CA (US); Zachury Minjack, San Francisco, CA (US); Zachery Kennedy, San Jose, CA (US); Dennis Park, Cupertino, CA (US); Dylan Edwards, Cupertino, CA (US); Anton Davydov, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 14/686,179

(22) Filed: Apr. 14, 2015

Related U.S. Application Data

(63) Continuation of application No. 14/613,165, filed on Feb. 3, 2015, now Pat. No. 9,396,369.

(60) Provisional application No. 62/111,214, filed on Feb. 3, 2015, provisional application No. 62/111,292, filed on Feb. 3, 2015.

(51) Int. Cl.
*G09B 19/00* (2006.01)
*G06K 19/07* (2006.01)

(52) U.S. Cl.
CPC ..... *G09B 19/0092* (2013.01); *G06K 19/0723* (2013.01)

(58) Field of Classification Search
CPC .................. G09B 19/0092; G09B 19/0723
USPC ............................................ 340/568.5–572.9
See application file for complete search history.

(56) References Cited

U.S. PATENT DOCUMENTS

| | | |
|---|---|---|
| 2,713,258 A | 7/1955 | Walton |
| 5,091,155 A | 2/1992 | Takayama et al. |
| 5,447,248 A | 9/1995 | Rodriguez et al. |
| 8,381,998 B1 | 2/2013 | Chang |
| 8,628,722 B2 | 1/2014 | Hyde et al. |
| 2004/0149020 A1 | 8/2004 | Lu et al. |
| 2005/0184870 A1 | 8/2005 | Galperin et al. |
| 2005/0258963 A1 | 11/2005 | Rodriguez et al. |
| 2007/0063858 A1 | 3/2007 | Lee et al. |
| 2010/0097193 A1* | 4/2010 | Tang ............... G06Q 10/00 340/10.4 |
| 2011/0029255 A1 | 2/2011 | Hyde et al. |
| 2011/0206378 A1 | 8/2011 | Bolling et al. |

(Continued)

FOREIGN PATENT DOCUMENTS

EP     2648123 A1   10/2013

OTHER PUBLICATIONS

Non-Final Office Action mailed Aug. 31, 2016 in U.S. Appl. No. 14/686,341. 10 pages.

(Continued)

*Primary Examiner* — Qutbuddin Ghulamali
(74) *Attorney, Agent, or Firm* — Kilpatrick Townsend & Stockton LLP

(57) ABSTRACT

In some embodiments, a computer-implemented method can be provided for encoding radio frequency identification (RFID) electronic tags to represent custom-order nutrition variables. At an electronic vendor device, a custom food order can be identified. At the electronic vendor device, a nutrition variable based on the custom food order can be determined. At the electronic vendor device, an RFID electronic tag can be encoded to store the nutritional variable.

23 Claims, 7 Drawing Sheets

(56) References Cited

U.S. PATENT DOCUMENTS

| | | | | |
|---|---|---|---|---|
| 2013/0280681 | A1* | 10/2013 | Narayan | G09B 19/0092 |
| | | | | 434/127 |
| 2014/0069838 | A1* | 3/2014 | Minvielle | B65D 85/00 |
| | | | | 206/459.5 |
| 2014/0365142 | A1 | 12/2014 | Baldwin | |
| 2015/0060674 | A1 | 3/2015 | Levels et al. | |
| 2016/0099753 | A1 | 4/2016 | Murray | |
| 2016/0238393 | A9* | 8/2016 | Graham | G06Q 30/02 |

OTHER PUBLICATIONS

Ex Parte Quayle Action mailed May 5, 2016 in U.S. Appl. No. 14/613,165. 11 pages.

Notice of Allowance mailed May 27, 2016 in U.S. Appl. No. 14/613,165. 7 pages.

U.S. Appl. No. 14/613,165, filed Feb. 3, 2015, entitled, "Electronic Tag Transmissions Corresponding to Physical Disturbance of Tag," (unpublished).

U.S. Appl. No. 14/686,341, filed Apr. 14, 2015, entitled, "Electronic Tag Transmissions Corresponding to Alcohol Content Identifications," (unpublished).

Boyle, T., "Fast Food Does QR Codes: Part 2 Taco bell," Qfuse, Aug. 14, 2013, http://qfuse.com/blog/fast-food-does-qr-codes-part-2-taco-bell/, downloaded Aug. 10, 2015, 3 pages.

Great Bytes Software, "FitTap," Google Play, 2014, https://play.google.com/store/apps/details?id=com.greatbytes.fittap&hl=en, downloaded Aug. 10, 2015, 2 pages.

Talbot, T., "QR codes: The key to loyalty and payments?," Mobile Marketer, Mar. 2013, http://www.mobilemarketer.com/cms/opinion/columns/15010.html, downloaded Aug. 10, 2015, 4 pages.

Perez, S., "Tagstand is NFC-Enabling a Giant Cocktail Party, Will Let Guests Facebook & Tweet From Their Wristbands," TechCrunch, May 11, 2012, http://techcrunch.com/2012/05/11/tagstand-is-nfc-enabling-a-giant-cocktail-party-will-let-guests-facebook-tweet-from-their-wristbands/, downloaded Aug. 10, 2015, 7 pages.

Questex, LLC., "Home Depot, Macy's, Target Evaluating QR Codes That Show Different Things Based on the Consumer's CRM," FierceMarkets, Oct. 2011, http://www.fierceretail.com/retailit/story/home-depot-macys-target-evaluating-qr-codes-that-show-different-things-based-on-the-consumers-crm, downloaded Aug. 10, 2015, 3 pages.

RapidNFC, "NFC Enabled Beer Mats," Mar. 24, 2013, http://web.archive.org/web/20130324042717/http://rapidnfc.com/item/135/other_nfc_products_nfc_enabled_beer_mats, downloaded Aug. 11, 2015, 2 pages.

Swedberg, C., "BarMaxx RFID Solution Tracks Liquor Usage by Weight," RFID Journal, Jan. 2013, http://www.rfidjournal.com/articles/view?10264, downloaded Aug. 10, 2015, 3 pages.

Swedberg, C., "Beverage Metrics Serves Up Drink-Management Solution," RFID Journal, Feb. 2011, http://www.rfidjournal.com/articles/view?8237, downloaded Aug. 11, 2015, 3 pages.

Swedberg, C., "NFC System to Aid Diners," RFID Journal, May 2011, http://www.rfidjournal.com/articles/view?8446, downloaded Aug. 10, 2015, 2 pages.

Swedberg, C., "Vegas Hotel-Casino Uses Tags to Keep Tabs on Liquor," RFID Journal, Jun. 2006, http://www.rfidjournal.com/articles/view?2447, downloaded Aug. 10, 2015, 1 page.

WMS Group, Inc., "TAG! You're It! Creative Ways to Use the New QR Code Technology," Feb. 18, 2014, http://web.archive.org/web/20140218011108/http:/wmsgroup.com/tag-youre-it-creative-ways-to-use-the-new-qr-code-technology, downloaded Aug. 11, 2015, 2 pages.

Wood, D., "Digital Receipt Tipping Point Within Two Years," Peace Journalism, Jun. 21, 2013, http://peacejournalism.com/blog/2013/06/21/digital-receipt-tipping-point-within-two-years/, downloaded Aug. 10, 2015, 4 pages.

* cited by examiner

ELECTRONIC TAG TRANSMISSIONS OF CUSTOM-ORDER NUTRITIONAL INFORMATION

CROSS-REFERENCE TO RELATED APPLICATIONS

The present disclosure is a continuation of U.S. patent application Ser. No. 14/613,165, filed Feb. 3, 2015, which claims the benefit of and priority to U.S. Provisional Application No. 62/111,214, filed on Feb. 3, 2015 and U.S. Provisional Application No. 62/111,292, filed on Feb. 3, 2015. Each of these applications is hereby incorporated by reference in its entirety for all purposes.

FIELD OF INVENTION

The present disclosure relates generally to an electronic tag encoding and transmitting data corresponding to a custom order. More specifically, the electronic tag can encode and transmit data corresponding to individual food items in a custom food order, and a receiving electronic device can use the data to update a cumulative nutrition variable (e.g., daily calorie count).

BACKGROUND

Healthy eating is an important behavior to maintaining good health. Restricting particular types of consumption can be advantageous, such as restricting calories, fat consumption, salt intake and/or sugar intake. Further, consuming at least a threshold quantity of vegetables, fruits, dairy, healthy fats, vitamins, water and so on are consumed can also be health advantageous. Nonetheless, many people struggle to meet various goals or guidelines, of which, many even fail to recognize their levels of consumption. One particular difficulty in tracking nutritional data occurs when individuals eat out of their homes. An increasing number of eateries are publishing nutritional information, but the nutritional information is frequently inconvenient to access at useful times and further is limited to stock items.

SUMMARY

In some embodiments, a computer-implemented method can be provided for encoding radio frequency identification (RFID) electronic tags to represent custom-order nutrition variables. At an electronic vendor device, a custom food order can be identified. At the electronic vendor device, a nutrition variable based on the custom food order can be determined. At the electronic vendor device, an RFID electronic tag can be encoded to store the nutritional variable.

In some embodiments, a computer-implemented method can be provided for using communications from RFID electronic tags to dynamically update cumulative nutrition variables. At an electronic user device, a cumulative nutrition variable associated with a user account can be identified. At the electronic user device and using RFID, data from an electronic tag can be received. The data can include information about a custom food order. A nutrition variable can be identified based on the data. The nutrition variable can reflect a nutrition characteristic of the custom food order. At the electronic user device, the cumulative nutrition variable can be updated based on the nutrition variable. A presentation reflecting the updated cumulative nutrition variable can be generated.

In some embodiments, an electronic device can be provided that includes one or more processors and a computer-readable storage medium containing instructions, that, when executed by the one or more processors, cause the one or more processors to perform actions of a method disclosed herein.

The following detailed description together with the accompanying drawings will provide a better understanding of the nature and advantages of the present invention.

DETAILED DESCRIPTION

Figure 1A:
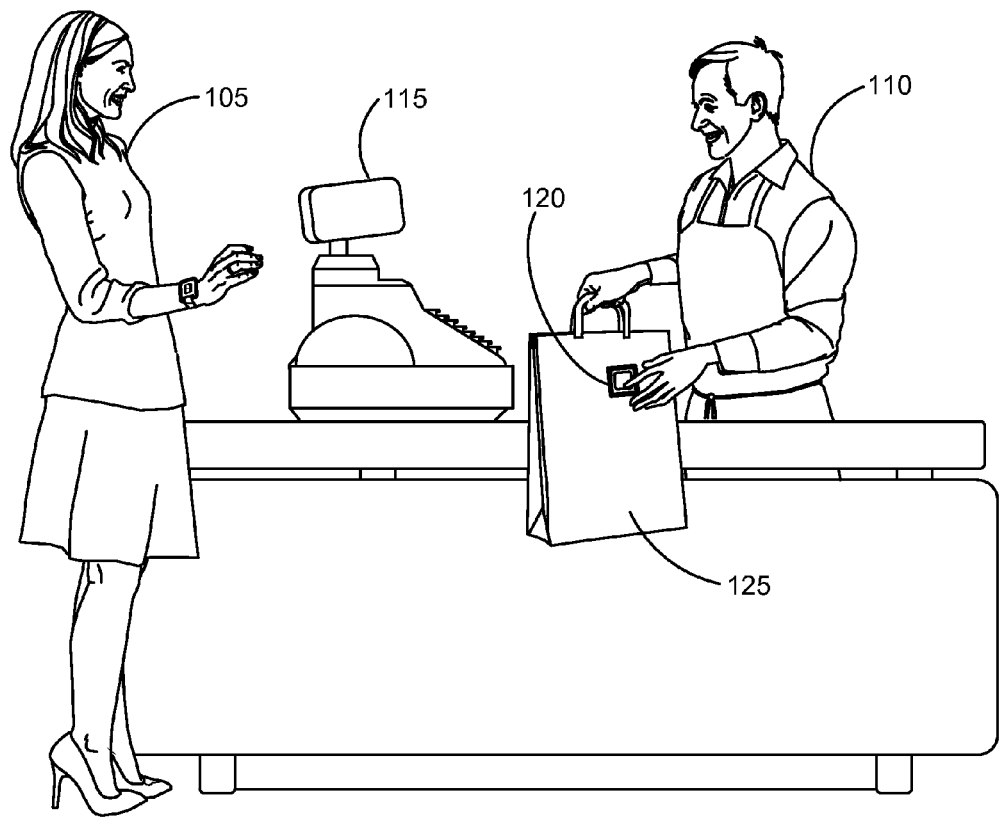
FIG. 1A illustrates an example of a provision of an electronic tag with custom-order nutrition data.

In certain embodiments of the present invention, a custom food (or drink) order is identified (e.g., via a transmission from an electronic user device to an electronic vendor device or via input entered at the electronic vendor device). The custom order can include one verbally or electronically placed (e.g., by a party or user device) and can include multiple items in the order, such as different menu items, one or more items to add to an ordered menu item and/or one or more items to exclude from an ordered menu item. A per-item nutrition variable (e.g., calorie quantity) can be identified for each item, and per-item nutrition variables can be combined to generate an order nutrition variable (e.g., by summing per-item nutrition variables of ordered items and/or subtracting nutrition variables for any excluded items). The electronic vendor device can encode an electronic tag to include a per-item nutrition variable for each item, the order nutrition variable and/or an identification of the items. The electronic tag can be provided to a user (e.g., customer), for example, along with the ordered food or drink, along with a receipt or in place of a receipt.

The electronic tag can then transmit the encoded data (e.g., via near-field communication (NFC)) to an electronic user device (e.g., in response to a tap of the device). The electronic user device can then use the data to update nutritional tracking information associated with a user account. For example, the electronic user device can maintain a current value for a daily calorie count and update the count based on the data.

As a specific illustration, a vendor employee can enter input to an electronic vendor device that indicates that a customer has ordered a hamburger with extra cheese and no ketchup, a small order of fries and a water. The electronic vendor device can identify a nutrition variable for each of the hamburger, cheese, ketchup, fries and water. The electronic vendor device can combine the nutrition variables for the hamburger, cheese and ketchup to generate a custom-hamburger nutrition variable in a manner such that the variables for the hamburger and cheese are combined and that for the ketchup is subtracted from the combined value. The electronic vendor device can encode an electronic tag (e.g., an NFC tag) to store data that includes an identification of each ordered item (e.g., hamburger plus cheese minus ketchup, small fries and water), a calorie count for each ordered item and a calorie count for the order as a whole. The vendor employee can stick the electronic tag (which can include an adhesive surface) to a food order package (e.g., bag, box, plate or lid). A user can then tap the electronic tag with a electronic user device, such that power is provided to the tag and/or a transmission of the data from the tag to the electronic user device is initiated. The electronic user device can present the data and/or update one or more user-associated variables (e.g., remaining calories in a daily calorie budget) based on the data.

FIG. 1A illustrates an example of a provision of an electronic tag with custom-order nutrition data. In this illustration, a user 105 can request particular food items as part of an order. In the depicted instance, user 105 can verbally identify the food items to a vendor 110, who can enter identifications of the food items via an electronic vendor device 115 (e.g., cash register, other point-of-sale terminal, computer, laptop, smartphone, portable music player and/or smart wearable device (e.g., watch, glasses, wristband or armband)). The identified food items can include items to be included in or excluded from the order. For example, the identified food item can include a base menu item included on a menu and, in some instances, an item that is normally present in the base menu item but is to be excluded for the particular order, an item that is normally not present in the base menu item that is to be included for the particular order and/or an item that is normally present in a first quantity but is to be included in a second quantity for the particular order.

Electronic vendor device 115 can identify a per-item nutrition variable for each item, for example, by looking up each item in a local or remote data store (e.g., a lookup table). These per-item nutrition variables can be combined according to which items are to be included in the order. Electronic vendor device 115 can encode an electronic tag 120 with data that includes the per-item nutrition variable(s) and/or combination nutrition variable(s). Electronic tag 120 can further include encoded data and/or information printed on a surface of the tag that identifies one or more items or combinations thereof in the order. Electronic tag 120 can include an adhesive surface, such that vendor 110 can position tag 120 on a container (e.g., bag 125) that contains the ordered food items.

Figure 1B:
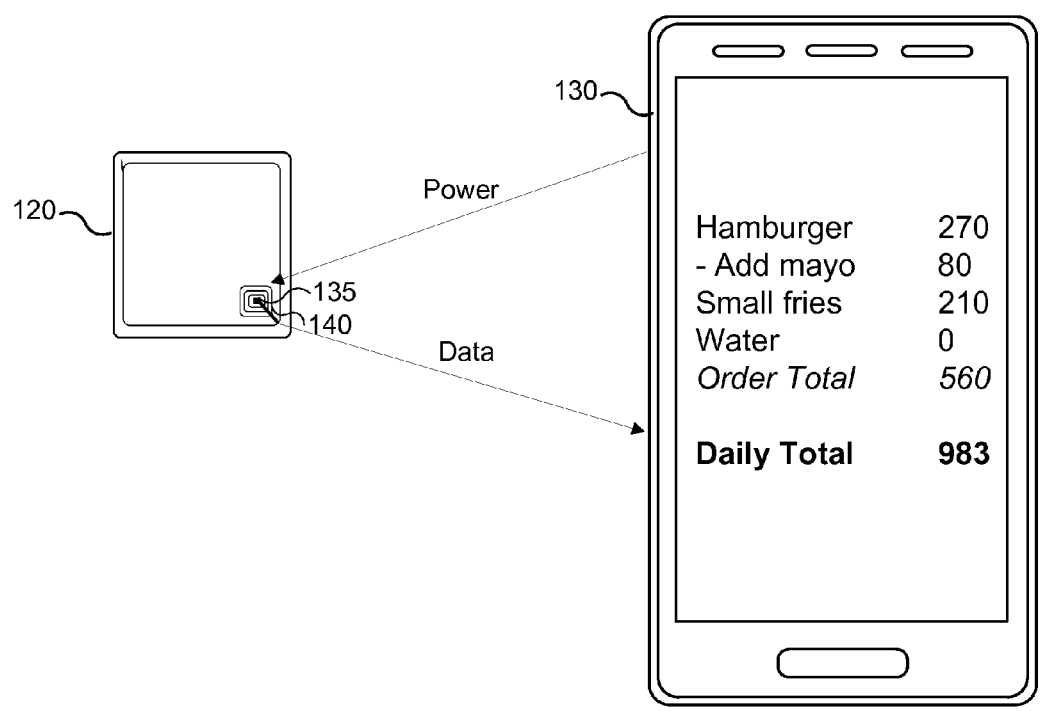
FIG. 1B illustrates an example of a data transmission from an electronic tag to an electronic device.

FIG. 1B illustrates an example of a data transmission from electronic tag 120 to an electronic user device 130. Electronic user device 130 can include a portable and/or hand-held device, such as a smartphone, portable music player and/or smart wearable device (e.g., watch, glasses, wristband or armband). In some instances, electronic user device 130 can store and execute an app, such as a nutrition app, that identifies one or more target quantities (e.g., upper thresholds for calories, fat intake, salt intake, sugar intake, etc.) and/or estimates or tracks a corresponding value for the user. In some instances, the tracked or estimated value can be determined by summing values of per-item, per-order or otherwise identified nutrition variables (e.g., those identified numerically or by food item by a user). In some instances, the tracked or estimated value can be adjusted based on an identified physical attribute of the user (e.g., weight or sex), an identified or detected movement or exercise of the user, identified consumptions (e.g., the user indicating that only half of a menu item was consumed) and so on.

In some instances, electronic user device 130 can scan for electronic tags by repeatedly (e.g., at least 1, 5 or 20 times per second) transmitting electrical and/or magnetic fields via an antenna (e.g., a radio frequency identification (RFID) antenna). When electronic tag 120 is sufficiently proximate to electronic user device 130 to receive the fields, electronic tag 120 can use the energy to power up tag 120, such that it can retrieve and transmit the encoded data to electronic user device 130 via an antenna (e.g., an RFID antenna). In some instances, transmission of the data is further conditioned upon one or more circumstances. For example, transmitting the data can be conditioned on a physical disturbance of tag 120 (e.g., as disclosed in U.S. application Ser. No. 14/613,165, filed on Feb. 3, 2015, entitled "ELECTRONIC TAG TRANSMISSIONS CORRESPONDING TO PHYSICAL DISTURBANCE OF TAG", which is hereby incorporated by reference in its entirety for all purposes) or receiving from electronic user device 130 a signal that corresponds to a request for the data or an identification of requested data (e.g., a type of nutrition variable or a customer's name). As another example, electronic user device 130 can require detection of a particular user input (e.g., selection of a "Get nutrition information" option presented on a display of device 130) prior to scanning for nearby electronic tags or prior to storing and/or using received data (e.g., for presentation or to update a tracked or estimated variable).

Upon receiving the data, electronic user device 130 can generate and present a presentation that identifies nutrition variables in the data. For example, in the depicted instance, electronic user device 130 can present a calorie count for each item and for the order. Electronic user device 130 can further use the data to update one or more cumulative nutrition variables. A cumulative nutrition variable can correspond to a sum over a time period, such as a portion of a day, day, week or month. The cumulative variable can correspond to a sum of individual nutrition values. For example, the cumulative variable can reflect a sum of all per-item nutrition variables of items that user input indicated were consumed during a time period and all per-item or per-order nutrition variables detected in data from electronic tags. Electronic user device 130 can store the cumulative variable, as illustrated in FIG. 1B. Per-item, per-order and/or cumulative nutrition variables can further be stored at electronic user device 130 (e.g., to support historical assessment of eating patterns).

Electronic tag 120 can include an electronic chip 135, which can execute one or more actions disclosed herein, and an antenna 140. Electronic chip 135 can include a microprocessor, memory and/or one or more capacitors (e.g., to tune antenna 140).

Antenna 140 can include, for example, a coil and/or loop antenna. Antenna 140 can include a plurality of loops. In some instances, at least two loops can differ in a radius or other dimension. This variation can allow the loops to be positioned in a plane, which can allow a thickness of electronic tag 120 to remain small. Nonetheless, in some instances, antenna 140 can instead include a plurality of loops having a similar or same radius (and/or some or all other dimensions) and/or being positioned in a stacked manner or a direction orthogonal to a primary surface of tag 120.

In some instances, antenna 140 can be configured so as to be affected by a physical disruption (e.g., of a particular type) of tag 120. For example, antenna 140 can include a segment configured to be severed by a separation of tag 120 into multiple pieces. As illustrated in the depicted instance, antenna 140 can include an outer loop having a shape and/or dimension corresponding to that of tag 120. The dimension can be substantially larger (e.g., at least 5, 10, 50 or 100 times larger) than a corresponding dimension of one or all other loops in antenna 140. The outer loop can be positioned so as to be (e.g., in its entirety or at least in one location) within a defined distance (e.g., 1 cm, 5 mm, or 1 mm) from a perimeter of tag 120. The outer loop can be configured to be fragile (e.g., due to a material or thickness of the outer loop).

The depicted positioning of outer loop can cause the loop to be severed upon a tearing of tag 120. Tag 120 can be configured such that electronic chip 135 detects a disturbance of tag 120 by detecting a disturbance (e.g., severing) of the outer loop. Electronic chip 135 can be configured so as to initiate transmission (e.g., via one or more undamaged loops in antenna 140 and/or another antenna) of data upon determining the disturbance.

It will be appreciated that electronic tag 120 can, in some instances, include one or more additional components not shown in FIG. 1B. For example, electronic tag 120 can include a top and/or bottom layer or surface (e.g., such that chip 135 as depicted in FIG. 1B is positioned between and/or enclosed within the surfaces), such as a laminate, plastic or paper surface. In some instances, a top surface includes text, a graphic and/or a code, and/or a bottom surface includes an adhesive. Text and/or a graphic on electronic tag 120 can correspond to an invitation to "tap" an electronic device to the tag or can indicate that positioning an electronic device near the tag will facilitate an information transfer from the tag to the device.

Electronic tag 120 can be flexible and/or can be attached to a flexible substrate. Electronic tag 120 can have a size that can be characterized according to multiple dimensions, such as length, width and thickness or radius and thickness. A thickness of electronic tag 120 can be less than, e.g., 10, 50 or 100 microns, or 1, 5 or 10 millimeters. A length, width and/or radius of electronic tag can be, for example, greater than 0.1, 0.5 or 1 centimeters and/or less than 1, 3, 5, 10, 30 or 50 centimeters.

It will be appreciated that, in some instances, tag 105 can include a configuration different than that described in relation to FIGS. 1A and/or 1B. For example, tag 105 can include an antenna 110 of a different shape and/or not including an outer loop having a substantially different radius or other dimension relative to other loops in antenna 110. In some instances, antenna 110 can include a sensor, such as a vibration sensor and/or an accelerometer, which can be able to detect movements indicative of tag 105 being torn. Particular measurements from the sensor (e.g., above-threshold measurements) can trigger transmission of data from tag 105. In some instances, transmission of data need not be conditioned upon disturbance detection.

It will also be appreciated that different types of data can be encoded at and/or transmitted by tag 105. For example, in one instance, the data can identify particular food or drink items, such as menu items, add-on items or items to be excluded, but need not include nutrition variables. Electronic user device 130 can then identify per-item (and, in some instances, per-order) nutrition variables. In yet another example, rather than or in addition to encoding the tag with data including a nutrition variable, the electronic vendor device can send a signal to a remote server with one or more nutrition variables and can encode the tag with data including a webpage link specific for an order or user. The remote server can then configure the custom webpage to include nutrition-relevant information (e.g., a cumulative nutrition variable, a per-order nutrition variable and/or one or more per-item nutrition variables), and receipt of the data at an electronic user device from the tag can cause the webpage to be presented on the electronic user device.

Figure 2:
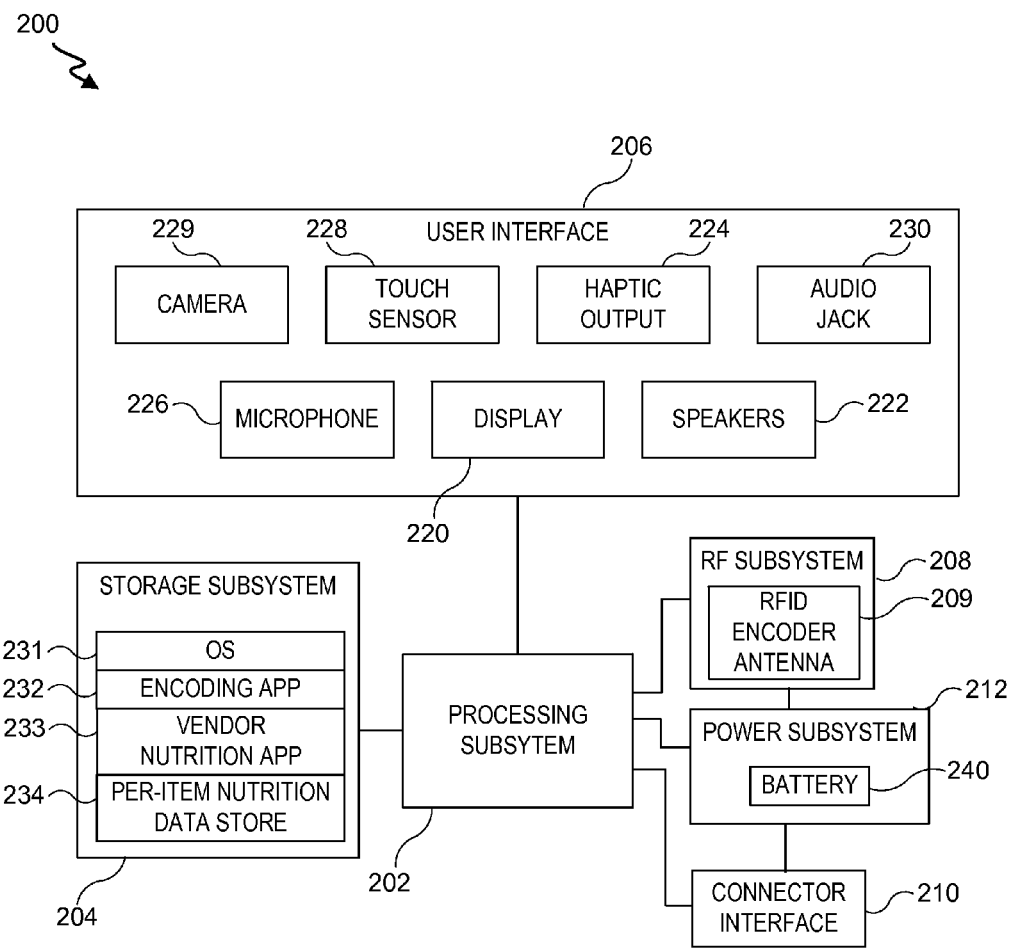
FIG. 2 is an example schematic diagram of an electronic vendor device according to an embodiment of the present invention.

FIG. 2 is an example schematic diagram of an electronic vendor device 200 (e.g., electronic vendor device 115) according to an embodiment of the present invention. Electronic vendor device 200 can include processing subsystem 202, storage subsystem 204, user interface 206, one or more connection components (e.g., RF subsystem 208 and/or connector interface 210), and power subsystem 212. Electronic vendor device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store code or instructions for an operating system 231 and/or one or more application programs (or apps), such as an encoding app 232 and vendor nutrition app 233, to be executed by processing subsystem 202.

Encoding app 232 can initiate, facilitate and/or control encoding of data in an electronic tag. In some instances, encoding app 232 can facilitate presentation of an interface that includes an option to initiate data encoding. The encoding can be performed, for example, in response to detecting an input and/or in response to detecting a nearby electronic tag.

Vendor nutrition app 233 can identify one or more nutrition variables to be included in the encoded data. Vendor nutrition app 233 can receive an identification of one or more food items to be included in and/or excluded from an order. The identifications can be received via input from a vendor and/or from a signal from another device, such as an electronic user device. Vendor nutrition app 233 can, in some instances, also identify a size of a food item, a substitution, and/or a food- or drink-pertinent option selection (e.g., side dish selection).

For each item, vendor nutrition app 233 can identify a per-item nutrition variable. The per-item nutrition variable can be numeric and can identify, for example, a quantity of calories, fat, sodium, protein, sugar, vitamin and so on. In some instances, for a given item, vendor nutrition app 233 identifies the per-item nutrition variable by looking up an item in a data store, such as a local per-item nutrition data store 234 or a remote per-item nutrition data store. The per-item nutrition data store 234 can associate each of a set of items with one or more nutrition variables (e.g., such that each item is associated with a row or column in a table or an index in an array). In some instances, the per-item nutrition data store is specific for a particular vendor. In some instances, the per-item nutrition data store is applicable across vendors. A lookup at the data store can include a query for an exact match (e.g., of an identifier of the item) or for a close or closest match.

Some menu items can themselves be a combination of component items. For example, a cheese pizza menu item can be a combination of pizza dough, pizza sauce and mozzarella cheese components (e.g., each of a particular quantity). Vendor nutrition app 233 can then, for example, nonetheless identify a nutrition variable by looking up a cheese pizza identifier, or vendor nutrition app 233 can identify the nutrition variable by identifying nutrition variables for each component and by summing them together.

In some instances, vendor nutrition app 233 identifies a per-order nutrition variable by combining per-item nutrition variables. For example, per-item nutrition variables can be summed across all items to be included in the order, and per-item nutrition variables for items to be excluded from the order can be subtracted from the sum.

Data to be encoded in the electronic tag can include per-item and/or per-order nutrition variables. Data can also include other types of information, such as per-item and/or per-order costs, a customer name, a vendor name, and/or a number of reward points. In some instances, encoding app 232 can further facilitate printing of information (e.g., cost, payment, customer, vendor and/or vendor employee information) on a surface of an electronic tag. In some instances, data to be encoded on a tag itself includes one or more nutrition variables. In some instances, data includes other information corresponding to the nutrition variables. For example, the data can include one or more links to webpages that include the nutrition variables.

User interface 206 can include any combination of input and output devices. In some instances, a vendor can operate input devices of user interface 206 to invoke the functionality of electronic vendor device 200 and can view, hear, and/or otherwise experience output from electronic vendor device 200 via output devices of user interface 206. Examples of output devices include display 220, speakers 222, and haptic output generator 224. Examples of input devices include microphone 226, touch sensor 228, and camera 229.

Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing electronic vendor device 200 to conform to a desired shape. One or more speakers 222 can be provided using small-form-factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing electronic vendor device 200 but not so strong as to produce distinct sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be overlaid over display 220 to provide a touchscreen interface, and processing subsystem 204 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images. Depending on implementation, the optical components can provide fixed focal distance or variable focal distance; in the latter case, autofocus can be provided. In some embodiments, camera 227 can be disposed along an edge of a face member of a device, e.g., the top edge, and oriented to allow a user to capture images of nearby objects in the environment such as a bar code or QR code. In other embodiments, camera 229 can be disposed on the front surface of a device face member, e.g., to capture images of the user. Zero, one, or more cameras can be provided, depending on implementation.

Microphone 226 can include any device that converts sound waves into electronic signals. In some embodiments, microphone 226 can be sufficiently sensitive to provide a representation of specific words spoken by a vendor; in other embodiments, microphone 226 can be usable to provide indications of general ambient sound levels without necessarily providing a high-quality electronic representation of specific sounds.

In some embodiments, user interface 206 can provide output to and/or receive input from an auxiliary device such as a headset. For example, audio jack 230 can connect via an audio cable (e.g., a standard 2.5-mm or 2.5-mm audio cable) to an auxiliary device. Audio jack 230 can include input and/or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuits, e.g., one or more single-core or multi-core microprocessors or microcontrollers, examples of which are known in the art. In operation, processing system 202 can control the operation of electronic vendor device 200. In various embodiments, processing subsystem 204 can execute a variety of programs in response to program code and can maintain multiple concurrently executing programs or processes. At any given time, some or all of the program code to be executed can be resident in processing subsystem 204 and/or in storage media such as storage subsystem 204.

Through suitable programming, processing subsystem 202 can provide various functionality for electronic vendor device 200. For example, in some embodiments, processing subsystem 202 can execute an operating system (OS) 231 and/or one or more apps 232 and/or 233.

RF subsystem 208 can allow electronic vendor device 200 to communicate wirelessly with various devices (e.g., an electronic tag). RF subsystem 208 can include RF transceiver components, such as an antenna (e.g., RFID encoder antenna 209) and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 208 can implement a proximity sensor that supports proximity detection (e.g., via NFC or Bluetooth Low Energy) through a detection of a signal, estimation of signal strength and/or other protocols for determining proximity to another electronic apparatus.

RFID encoder antenna 209 can include antennas configured to transmit electric and/or magnetic signals (e.g., having linear or circular polarization). RFID encoder antenna 209 can repeatedly scan for electronic tags. Because some tags can be passive and not including a power source (or can have a limited power reserve), to detect the tag, RFID reader antenna can repeatedly transmit a power signal. If such signal is transmitted while near a tag, the tag can convert the signal into electrical energy and use the energy to generate and transmit a signal back to electronic vendor device 200. In some instances, between 1 and 20 scanning transmissions can be transmitted per second.

In some embodiments, RF subsystem 208 can provide NFC capability, e.g., implementing the ISO/IEC 18092 standards or the like; NFC can support wireless data exchange between devices over a very short range (e.g., 20 centimeters or less). RF subsystem 208 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF subsystem 208. In some instances, a same component of RF subsystem 208 can serve to receive incoming signals and transmit outgoing signals (e.g., by outputting a field and intercepting a modulation of the field). In some instances, different components handle incoming and outgoing signals.

RFID encoder antenna 209 can be used to transmit data to an electronic tag and/or to transmit instructions to store and/or lock the data. In some instances, RFID encoder antenna 209 can further transmit transmission conditions, such that electronic tag is only to transmit data to an electronic user device upon detection that a transmission condition has been satisfied.

Power subsystem 212 can provide power and power management capabilities for electronic vendor device 200. For example, power subsystem 214 can include a battery 240 (e.g., a rechargeable battery) and associated circuitry to distribute power from battery 240 to other components of electronic vendor device 200 that require electrical power. In some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240.

Power subsystem 212 can also provide power management capabilities, such as regulating power consumption of other components of electronic vendor device 200 based on the source and amount of available power, monitoring stored power in battery 240, generating user alerts if the stored power drops below a minimum level, and so on. Power subsystem 212 can also coordinate distribution of power to RF subsystem 208 so as to facilitate conversion of electrical power to electric and/or magnetic fields to be transmitted in scanning signals and/or to electronic tags.

In some embodiments, control functions of power subsystem 212 can be implemented using programmable or controllable circuits operating in response to control signals generated by processing subsystem 202 in response to program code executing thereon, or as a separate microprocessor or microcontroller. In some embodiments, control functions of power subsystem 212 can be based on user interaction with the device (e.g., to power down components if a device has not been interacted with in a particular manner, such as via a touch, button press or network activity, for a defined period of time).

It will be appreciated that electronic vendor device 200 is illustrative and that variations and modifications are possible. For example, electronic vendor device 200 can include an additional printing component configured to print text and/or images onto a surface of an electronic tag.

While the electronic vendor device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic vendor devices implemented using any combination of circuitry and software. It is also not required that every block in FIG. 2 be implemented in a given embodiment of an electronic vendor device.

Figure 3:
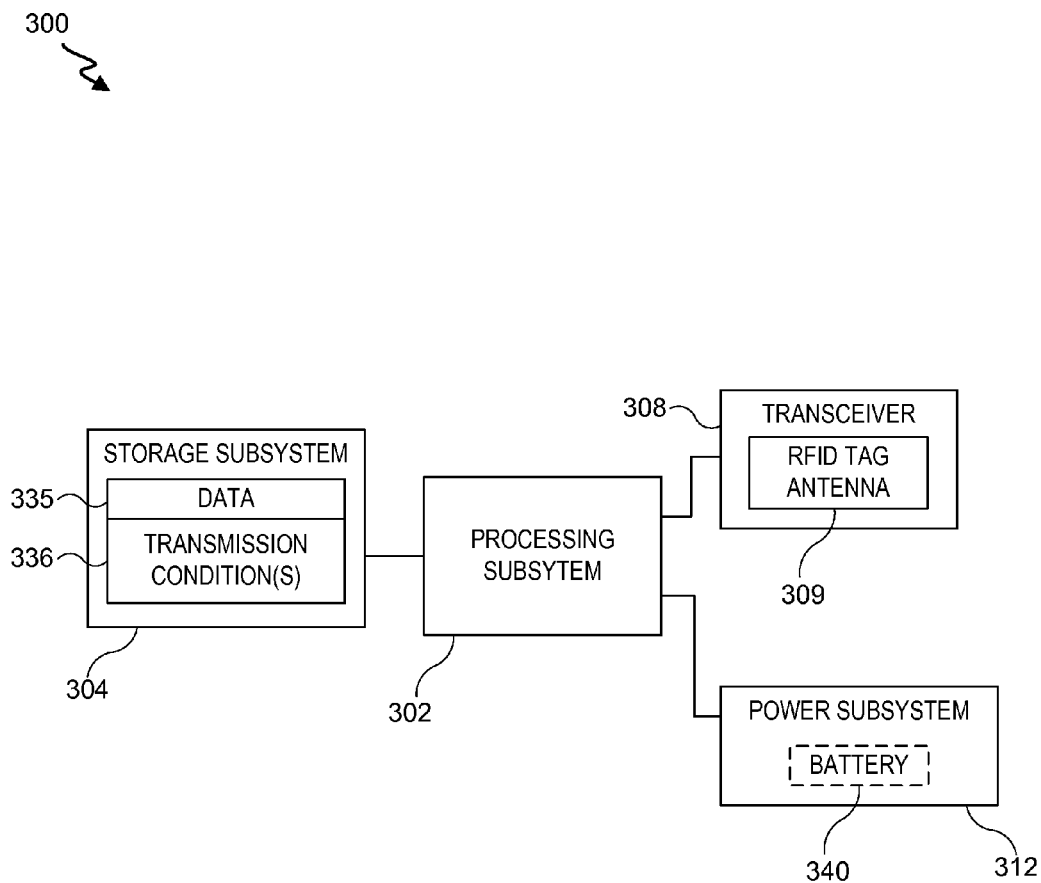
FIG. 3 is an example schematic diagram of an electronic tag according to an embodiment of the present invention.

FIG. 3 is an example schematic diagram of an electronic tag 300 (e.g., electronic tag 120) according to an embodiment of the present invention. Electronic tag 300 can include processing subsystem 302, storage subsystem 304, one or more connection components (e.g., transceiver subsystem 308) and a power subsystem 312. Electronic tag 300 can also include other components (not explicitly shown), such as one or more sensors to detect variables (e.g., movement, loss of pin detection, acceleration) that can be indicative of a physical disruption to and/or breaking of tag 300.

Storage subsystem 304 can be implemented, e.g., using magnetic storage media, flash memory, other semiconductor memory (e.g., DRAM, SRAM), or any other non-transitory storage medium, or a combination of media, and can include volatile and/or non-volatile media. In some instances, some or all of the memory in storage subsystem 304 is readable and writable. In some instances, storage subsystem 304 can be configured such that (e.g., after encoding of tag 300) part or all of the memory can be locked to prevent alteration. Memory in storage subsystem 304, in some instances, can be less than or equal to 1 or 10 kB.

In some embodiments, storage subsystem 304 can store data 335 to be (e.g., conditionally or unconditionally) transmitted to one or more nearby devices. Data 335 can include data encoded via another device and/or software. Data 335 can include, for example, one or more numbers, text, a link (e.g., a web address) and/or a command. Data 335 can include one or more nutrition variables (e.g., per-item and/or per-order nutrition variables) and/or data encoded by an encoding app 231 on an electronic vendor device 200.

In some instances, tag 300 can be configured to accompany a product, such as a food product sold at an eatery. For example, tag 300 can include or can be a sticker to be placed on a package or container of the product. Data 335 can then, for example, relate to the product and/or a purchase of the product. Such data 335 can include information about and/or related to the product (e.g., calorie count, fat grams, sodium content, sugar amount, vitamin quantities, etc.).

Data 335 can additionally or alternatively include a command to modify account data to reflect, for example, purchase and/or consumption of the product. To illustrate, the modification can include incrementing one or more cumulative nutrition variables (e.g., calorie counts, fat-gram counts and/or vitamin-unit counts) by defined amounts. As a further example, the modification can include an indication of a time of day that data was received from a tag, a vendor (e.g., Hamburger Restaurant or Pizza Restaurant at 100 Main St.).

Data 335 can additionally or alternatively include a command to initiate or facilitate a presentation of part of data 335 and/or a processed version thereof. For example, a command can facilitate presentation at an electronic user device of one or more per-item nutrition variables, per-order nutrition variables and/or cumulative nutrition variables (e.g., immediately or upon request).

In some embodiments, storage subsystem 304 can also store one or more transmission conditions 336 that identify when some or all of data 335 is to be transmitted. A transmission condition can include, for example, one described in U.S. Application No. 62/111,214, filed on Feb. 3, 2015, entitled "ELECTRONIC TAG TRANSMISSIONS CORRESPONDING TO ALCOHOL CONTENT IDENTIFICATIONS", which is hereby incorporated by reference in its entirety for all purposes. In some instances, data can be transmitted irrespective of any explicit condition. For example, data can be repeatedly broadcasted and/or transmitted (e.g., once or repeatedly) so long as power is available to electronic tag 300.

Processing subsystem 302 can be implemented as one or more integrated circuits, e.g., one or more single-core or multi-core microprocessors or microcontrollers, examples of which are known in the art. In operation, processing system 302 can control the operation of electronic tag 300. In various embodiments, processing subsystem 304 can execute a variety of programs in response to program code and can maintain multiple concurrently executing programs or processes. At any given time, some or all of the program code to be executed can be resident in processing subsystem 304 and/or in storage media such as storage subsystem 304.

Through suitable programming, processing subsystem 302 can provide various functionality for electronic tag 300. For example, in some embodiments, processing subsystem 302 can execute code to transmit data 335 and/or evaluate one or more transmission conditions 336.

Transceiver subsystem 308 can allow electronic tag 300 to communicate wirelessly with various electronic devices. Transceiver interface 308 can include a component, such as an antenna (e.g., a radio frequency identification (RFID) tag antenna 309) and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 308 can implement a proximity sensor that supports proximity detection (e.g., via NFC or Bluetooth Low Energy) through a detection of a signal, estimation of signal strength and/or other protocols for determining proximity to another electronic device.

RFID tag antenna 309 can include, for example, an NFC antenna and/or a loop antenna with one or more loops. In some instances, a length of antenna is less than, e.g., 1, 3, 5 or 10 cm. RFID tag antenna 309 can include or be a passive, receiving antenna. An operating frequency of RFID tag antenna 309 can include a low frequency (e.g., 125-134 kHz), high frequency (e.g., between 10-30 MHz, such as 13.56 MHz) or ultra-high frequency (e.g., greater than 800 MHz).

In some embodiments, transceiver subsystem 308 can provide NFC capability, e.g., implementing the ISO/IEC 18092 standards or the like; NFC can support wireless data exchange between devices over a very short range (e.g., 20 centimeters or less). Transceiver subsystem 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into transceiver subsystem 308. In some instances, a same component of transceiver subsystem 308 can serve to receive incoming signals and transmit outgoing signals. In some instances, different components handle incoming and outgoing signals.

In some embodiments, electronic tag 300 includes a power subsystem 312 that can provide power management capabilities for electronic tag 300 and, in some instances, can provide power for electronic tag 300. Power subsystem 312 can include circuitry to distribute received, converted and/or stored power to other components of electronic tag 300 that require electrical power.

In some instances, power subsystem 312 can convert electric and/or magnetic fields (e.g., received via antenna 309) into electrical energy, which can be distributed to tag components and/or used to charge a local battery. In some (but not other instances), power subsystem 314 can include a battery 340 (e.g., a rechargeable battery) and can also include circuitry operable to charge battery 340. Thus, in some embodiments, power subsystem 312 can include a "wireless" charger, such as an inductive charger, to charge battery 340. This capability can be used to extend a time during which tag 300 can transmit data (e.g., such that data can be transmitted even when it is not sufficiently close to be powered by a nearby electronic device) and/or can allow electronic tag 300 to communicate using a different communication protocol and/or over a larger range. For example, power can be received via NFC from a nearby electronic device and used to charge battery 340. As the device is moved away from the device, tag 300 may be unable to communicate with the device via NFC. However, the charge of the battery can allow tag 300 to use a more power-intensive protocol (e.g., Bluetooth Low Energy) to communicate with the device, thereby extending a time during which the tag and device can communicate. In some embodiments, power subsystem 312 can also include other power sources, such as a solar cell, in addition to or instead of battery 340.

In some embodiments, power subsystem 312 can control power distribution to components within electronic tag 300 to manage power consumption efficiently. For example, power subsystem 312 can automatically place device 300 into a "hibernation" state when it is determined or inferred that no electronic device is nearby (e.g., due to a lack of incoming signals). The hibernation state can serve to inhibit or pause outgoing transmissions of data.

Power subsystem 312 can also provide other power management capabilities, such as regulating power consumption of other components of electronic tag 300 based on the source and amount of available power, monitoring stored power in battery 340, and so on.

In some embodiments, control functions of power subsystem 312 can be implemented using programmable or controllable circuits operating in response to control signals generated by processing subsystem 302 in response to program code executing thereon, or as a separate microprocessor or microcontroller.

It will be appreciated that electronic tag 300 is illustrative and that variations and modifications are possible. For example, transceiver subsystem 308 can include a different type of antenna 309 and/or can include one or more frequency-tuning components (e.g., capacitors). As another example, tag 300 can include a weight sensor that can detect a downwards force being applied to tag 300. Thus, if tag 300 is positioned on or is part of a bottom surface of a food container, a measurement from the weight sensor can be used to estimate a portion of a food item that has been removed from (for at least a defined period of time) the container, such that it can be estimated that the user consumed a food item in the container. In some instances, tag 300 can condition transmission of data 335 on an estimation that a defined portion (or all) of the food item was consumed. In some instances, tag 300 can include in a data transmission an estimation of a portion of a food item or order that was consumed or nutrition data for the estimated consumed portion.

Further, while the electronic tag 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic tags implemented using any combination of circuitry and software. It is also not required that every block in FIG. 3 be implemented in a given embodiment of an electronic tag.

Figure 4:
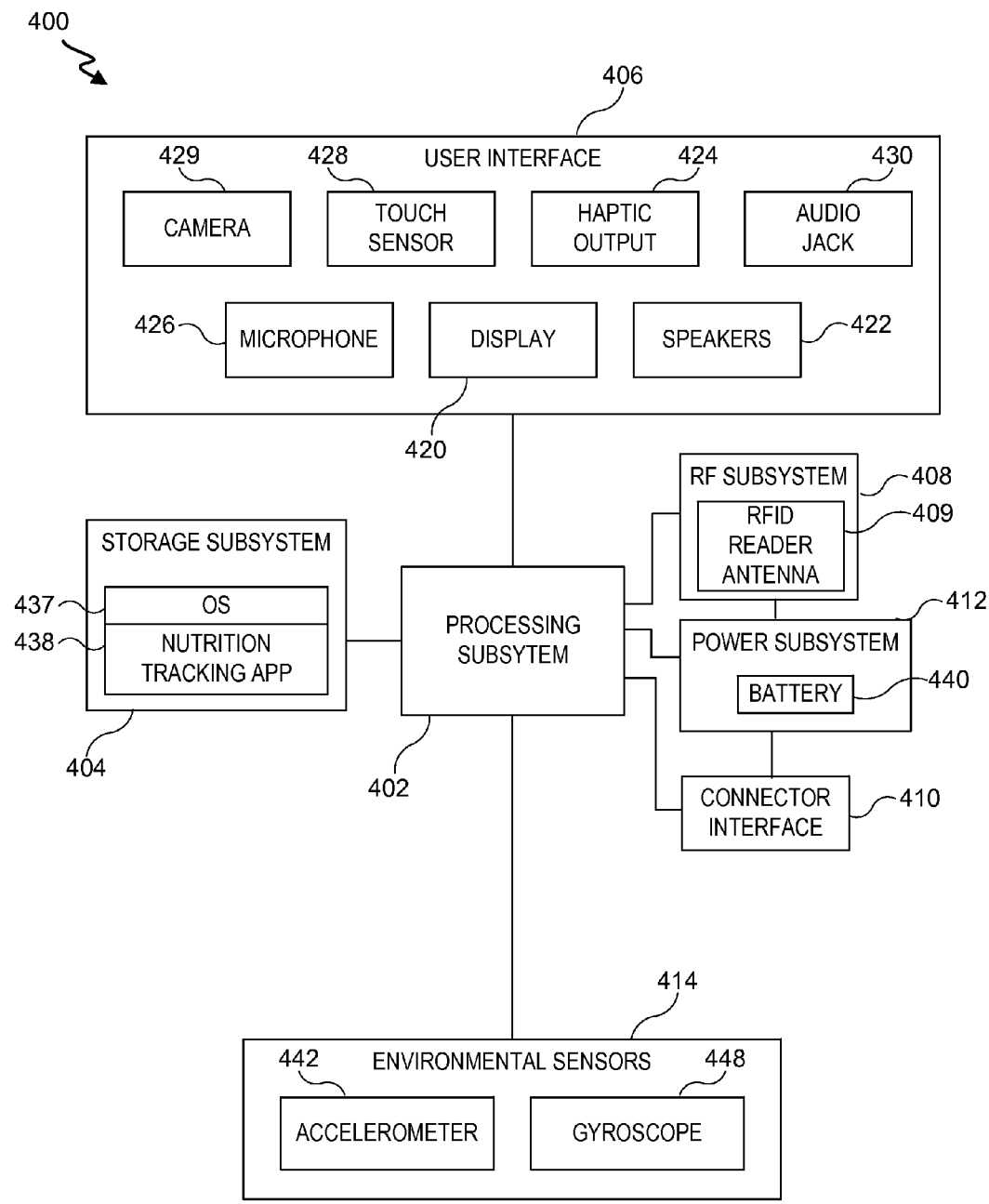
FIG. 4 is an example schematic diagram of an electronic user device according to an embodiment of the present invention.

FIG. 4 is an example schematic diagram of an electronic user device 400 (e.g., electronic user device 130) according to an embodiment of the present invention. Electronic user device 400 can include processing subsystem 402, storage subsystem 404, user interface 406, one or more connection components (e.g., RF subsystem 408 and/or connector interface 410), power subsystem 412, and environmental sensors 414. In some instances, one or more components of electronic user device 400 can parallel or complement similarly numbered components of electronic vendor device 200 and/or electronic tag 300. Electronic user device 400 can also include other components (not explicitly shown).

Storage subsystem 404 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 404 can store media items such as audio files, video files, image or artwork files; information about a user's contacts (names, addresses, phone numbers, etc.); appointments and events; notes; and/or other types of information, examples of which are described below.

In some embodiments, storage subsystem 404 can also store code or instructions for an operating system 437 and/or one or more application programs (or apps), such as a nutrition tracking app 438, to be executed by processing subsystem 402.

Execution of nutrition tracking app 438 can, in some instances, result in an identification of a target nutrition variable. The target nutrition variable can include, for example, a quantity of calories, fat units (e.g., grams), protein units (e.g., grams), sugar units (e.g., grams), sodium units (e.g., grams) and/or vitamin units. The target nutrition variable can be set to a defined value, identified in user input and/or can be automatically determined by electronic user device 400. The automatic determination can be based on one or more target results (e.g., target weight, target weight loss, target cholesterol, target blood pressure, target glucose level and/or target vitamin level) as identified based on or in user input and/or based on one or more user characteristics (e.g., current or historical: weight, cholesterol, blood pressure, glucose level and/or vitamin level; current or historical medical condition and/or disease, such as pre-diabetes, diabetes, cardiac arrest or stroke; height; sex; race; genetic or familial risk factors; geographical location; current or past eating patterns (e.g., calories consumed per day, types of food preferences, etc.); and/or identified target periods of time for reaching a goal (e.g., target weight). Thus, in some instances, execution of nutrition tracking app 438 results in a presentation of a user interface that can receive information about a user and/or one or more nutrition or health-related goals (e.g., weight-loss goals).

Execution of nutrition tracking app 438 can facilitate tracking one or more nutrition variables, such as a quantity of calories, fat, sugar, salt, protein, a vitamin or a mineral. In one instance, nutrition tracking app 438 can store one or more cumulative nutrition variables. Each cumulative nutrition variable can be set to zero at defined times (e.g., 12 am each day or 5 am each Sunday). Each cumulative nutrition variable can then be repeatedly adjusted based on user input, data from one or more sensors of electronic user device 400 and/or a signal received from another electronic apparatus (e.g., electronic tag or remote server). The adjustment can include, for example, incrementing the cumulative nutrition variable by a defined amount (e.g., a fixed value or a value as identified in or corresponding to received data or user input), such as by a per-item nutrition variable.

In one instance, a user interface can be presented that allows a user to identify one or more food and/or drink items that the user has or intends to consume. For example, a user interface can include a search box, where a user can enter a keyword, and an identification of each one or more food and/or drink items can be presented. A user can then select an identification of an item and/or can identify a quantity, and a per-item nutrition variable associated with the item can be added to a cumulative nutrition variable.

In one instance, nutrition tracking app 438 can be configured to detect whether electronic user device 400 is in any of a set of establishments (e.g., geographical regions). For example, it can be determined whether electronic user device 400 can detect a device associated with a particular establishment (e.g., any electronic vendor device associated with the establishment or a server at the establishment), or it can be determined whether geographical coordinates of the device are within a prescribed region for an establishment. If so, identifications or each of one or more of a set of menu items corresponding to an identified establishment can be received from another device (e.g., electronic vendor device or remote server), retrieved from storage and/or presented so as to allow a user to select a food item that has been or will be consumed.

In one instance, electronic user device 400 can receive a signal from another electronic apparatus, such as electronic tag 300. The signal can include or otherwise identify one or more food items and/or one or more incrementing nutrition variables (e.g., a per-item or per-order nutrition variable). Receipt of the signal can, in some instances, result in an automatic adjustment of a cumulative nutrition variable (e.g., to increment it by the incrementing nutrition variable). In some instances, receipt of the signal facilitates a presentation that requests that a user enter input indicating whether an identified food item has been or will be consumed (or to identify who has or will consume the item) and/or to identify a portion of the food item that has been or will be consumed.

In one instance, execution of nutrition tracking app 438 can facilitate an automatic estimation of whether a user of electronic user device 400 has consumed one or more food items and/or a portion that has been consumed. This estimation can be based on one or more measurements of a sensor of electronic user device 400. For example, the estimation can be based on whether a gyroscope or accelerometer on a wearable device detects motion data indicative of a user moving his or her arm to and from his mouth. As another example, the estimation can be based on biometric sensor data (e.g., corresponding to a heart rate or pulse) indicating that a user is or was eating. One or more cumulative nutrition variables can then be conditionally adjusted depending on whether it was estimated that a user consumed a food item.

Execution of nutrition tracking app 438 can further initiate and/or facilitate a presentation. The presentation can include, for example, one or more: cumulative nutrition variables, target nutrition variables, differences between target nutrition variables and cumulative nutrition variables, per-item nutrition variables and/or per-order nutrition variables. For example, a presentation can indicate that a target nutrition variable is set to 1500 calories per day, that a user was estimated to have consumed 750 calories during a recent lunch meal, that a cumulative daily calorie count is 1100, and that there are only 400 calories remaining in the daily calorie budget.

User interface 406 can include any combination of input and output devices. In some instances, a user can operate input devices of user interface 406 to invoke the functionality of electronic user device 400 and can view, hear, and/or otherwise experience output from electronic user device 400 via output devices of user interface 406. Examples of output devices include display 420, speakers 422, and haptic output generator 424. Examples of input devices include microphone 426, touch sensor 428, and camera 429.

Display 420 can be implemented using compact display technologies, e.g., LCD (liquid crystal display), LED (light-emitting diode), OLED (organic light-emitting diode), or the like. In some embodiments, display 420 can incorporate a flexible display element or curved-glass display element, allowing electronic user device 400 to conform to a desired shape. One or more speakers 422 can be provided using small-form-factor speaker technologies, including any technology capable of converting electronic signals into audible sound waves. In some embodiments, speakers 422 can be used to produce tones (e.g., beeping or ringing) and can but need not be capable of reproducing sounds such as speech or music with any particular degree of fidelity. Haptic output generator 424 can be, e.g., a device that converts electronic signals into vibrations; in some embodiments, the vibrations can be strong enough to be felt by a user wearing master electronic user device 400 but not so strong as to produce distinct sounds.

Touch sensor 428 can include, e.g., a capacitive sensor array with the ability to localize contacts to a particular point or region on the surface of the sensor and in some instances, the ability to distinguish multiple simultaneous contacts. In some embodiments, touch sensor 428 can be overlaid over display 420 to provide a touchscreen interface, and processing subsystem 404 can translate touch events (including taps and/or other gestures made with one or more contacts) into specific user inputs depending on what is currently displayed on display 420.

Camera 429 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 404 and/or transmitted by master electronic user device 400 to other devices for storage. Depending on implementation, the optical components can provide fixed focal distance or variable focal distance; in the latter case, autofocus can be provided. In some embodiments, camera 427 can be disposed along an edge of a face member of a device, e.g., the top edge, and oriented to allow a user to capture images of nearby objects in the environment such as a bar code or QR code. In other embodiments, camera 429 can be disposed on the front surface of a device face member, e.g., to capture images of the user. Zero, one, or more cameras can be provided, depending on implementation.

Microphone 426 can include any device that converts sound waves into electronic signals. In some embodiments, microphone 426 can be sufficiently sensitive to provide a representation of specific words spoken by a user; in other embodiments, microphone 426 can be usable to provide indications of general ambient sound levels without necessarily providing a high-quality electronic representation of specific sounds.

In some embodiments, user interface 406 can provide output to and/or receive input from an auxiliary device such as a headset. For example, audio jack 430 can connect via an audio cable (e.g., a standard 2.5-mm or 4.5-mm audio cable) to an auxiliary device. Audio jack 430 can include input and/or output paths. Accordingly, audio jack 430 can provide audio to the auxiliary device and/or receive audio from the auxiliary device. In some embodiments, a wireless connection interface can be used to communicate with an auxiliary device.

Processing subsystem 402 can be implemented as one or more integrated circuits, e.g., one or more single-core or multi-core microprocessors or microcontrollers, examples of which are known in the art. In operation, processing system 402 can control the operation of electronic user device 400. In various embodiments, processing subsystem 404 can execute a variety of programs in response to program code and can maintain multiple concurrently executing programs or processes. At any given time, some or all of the program code to be executed can be resident in processing subsystem 404 and/or in storage media such as storage subsystem 404.

Through suitable programming, processing subsystem 402 can provide various functionality for electronic user device 400. For example, in some embodiments, processing subsystem 402 can execute an operating system (OS) 437 and/or one or more apps (e.g., nutrition tracking app 438).

RF subsystem 408 can allow electronic user device 400 to communicate wirelessly with various devices (e.g., electronic tag 300). RF subsystem 408 can include RF transceiver components, such as an antenna (e.g., RFID reader antenna 409) and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 208 can implement a proximity sensor that supports proximity detection (e.g., via NFC or Bluetooth Low Energy) through a detection of a signal, estimation of signal strength and/or other protocols for determining proximity to another electronic device.

RFID reader antenna 409 can include one or more antennas configured to transmit electric and/or magnetic signals (e.g., having linear or circular polarization). RFID reader antenna 409 can repeatedly scan for electronic tags. Because some tags can be passive and not including a power source (or can have a limited power reserve), to detect the tag, RFID reader antenna can repeatedly transmit a power signal.

If such signal is transmitted while near a tag, the tag can convert the signal into electrical energy and use the energy to generate and transmit a signal back to electronic user device 400. In some instances, between 1 and 20 scanning transmissions can be transmitted per second.

In some embodiments, RF subsystem 408 can provide NFC capability, e.g., implementing the ISO/IEC 18092 standards or the like; NFC can support wireless data exchange between devices over a very short range (e.g., 20 centimeters or less). RF subsystem 408 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF subsystem 408. In some instances, a same component of RF subsystem 408 can serve to receive incoming signals and transmit outgoing signals (e.g., by outputting a field and intercepting a modulation of the field). In some instances, different components handle incoming and outgoing signals.

Environmental sensors 414 can include various electronic, mechanical, electromechanical, optical, or other devices that provide information related to external conditions around electronic user device 400. Sensors 414 in some embodiments can provide digital signals to processing subsystem 402, e.g., on a streaming basis or in response to polling by processing subsystem 402 as desired. Any type and combination of environmental sensors can be used; shown by way of example are an accelerometer 442 and gyroscope 448.

Some environmental sensors can provide information about the location and/or motion of electronic user device 400. For example, accelerometer 442 can detect an acceleration of electronic user device 400 (e.g., generally or in each of one or more directions). As another example, gyroscope 448 can detect a rotation of electronic user device 400.

Power subsystem 412 can provide power and power management capabilities for electronic user device 400. For example, power subsystem 414 can include a battery 440 (e.g., a rechargeable battery) and associated circuitry to distribute power from battery 440 to other components of electronic user device 400 that require electrical power. In some embodiments, power subsystem 412 can also include circuitry operable to charge battery 440, e.g., when connector interface 410 is connected to a power source. In some embodiments, power subsystem 412 can include a "wireless" charger, such as an inductive charger, to charge battery 440 without relying on connector interface 410. In some embodiments, power subsystem 412 can also include other power sources, such as a solar cell, in addition to or instead of battery 440.

Power subsystem 412 can also provide power management capabilities, such as regulating power consumption of other components of electronic user device 400 based on the source and amount of available power, monitoring stored power in battery 440, generating user alerts if the stored power drops below a minimum level, and so on. Power subsystem 412 can also coordinate distribution of power to RF subsystem 408 so as to facilitate conversion of electrical power to electric and/or magnetic fields to be transmitted in scanning signals and/or to electronic tags.

In some embodiments, control functions of power subsystem 412 can be implemented using programmable or controllable circuits operating in response to control signals generated by processing subsystem 402 in response to program code executing thereon, or as a separate microprocessor or microcontroller. In some embodiments, control functions of power subsystem 412 can be based on user interaction with the device (e.g., to power down components if a device has not been interacted with in a particular manner, such as via a touch, button press or network activity, for a defined period of time).

It will be appreciated that electronic user device 400 is illustrative and that variations and modifications are possible. For example, electronic user device 400 can include an additional sensors, such as a biometric sensor to detect (for example) a user's heart rate or pulse.

Further, while the electronic user device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of an electronic user device.

Figure 5:
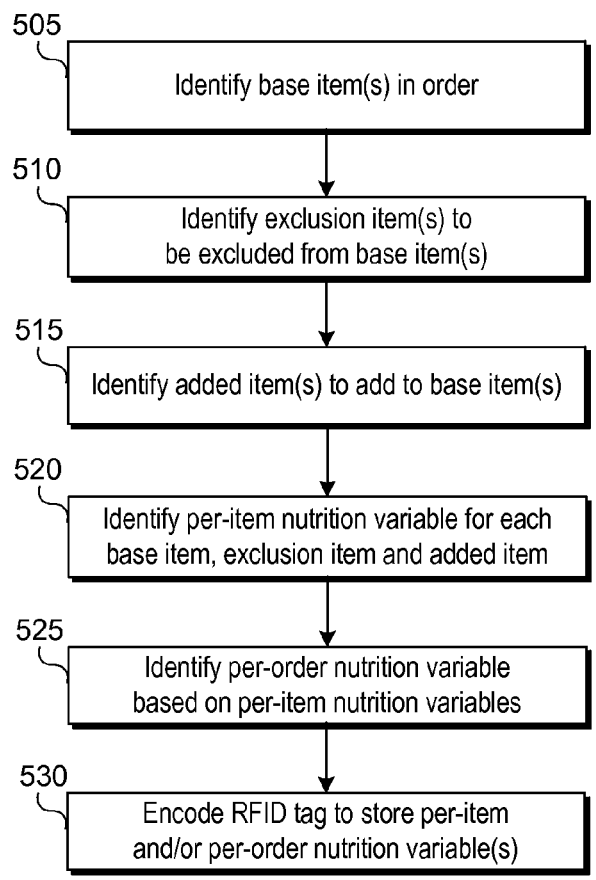
FIG. 5 is a flow diagram of a process for encoding an electronic tag with nutritional data corresponding to a custom order according to an embodiment of the invention.

FIG. 5 is a flow diagram of a process 500 for encoding an electronic tag with nutritional data corresponding to a custom order according to an embodiment of the invention. Process 500 can be performed, in part or in its entirety by an electronic vendor device, such as electronic vendor device 115 or electronic vendor device 200. In some instances, execution of encoding app 232 and/or vendor nutrition app 233 causes one or more processors of the electronic vendor device to perform one or more actions in process 500.

Process 500 can begin at block 505 where one or more base items in an order can be identified. A base item can include, for example, an item on a menu (e.g., associated with a particular vendor), which can include one or more ingredients or food components. For example, a base item can include a sandwich, a kebob plate or a grilled chicken burrito. In some instances, block 505 includes detecting input from a vendor (e.g., cashier) that is indicative of the base item. For example, a vendor could select an input corresponding to a base item by pressing a particular virtual or non-virtual button or key. In some instances, the base item is identified based on a signal received from another apparatus. For example, a user can identify items to be included in an order via an electronic user device, and the electronic user device can transmit a signal identifying the items to an electronic vendor device. As another example, identifications of the items can be included in a signal received from a remote server.

At block 510, one or more exclusion items can be identified. An exclusion item can be one that is typically included in a base item but that is not to be included for a particular order. For example, for a chicken marinara sandwich base item, it may typically be provided with cheese; however, a user can request to have the cheese excluded from the sandwich. Each exclusion item can be identified in a manner similar to an identification of block 505. For example, an exclusion item can be identified based on input received at an electronic vendor device or by detecting a signal from an electronic user device.

At block 515, one or more added items can be identified. An added item can be one that is typically not included in a base item but that is to be included for a particular order. For example, for a chicken marinara sandwich base item, it may typically not be provided with mushrooms; however, a user can request to have mushrooms added to the sandwich. In some instances, an added item corresponds to a requested increased quantity of an item. For example, for a chicken marinara sandwich base item that typically is provided with cheese, a user can request an extra slice of cheese or double cheese. Each added item can be identified in a manner similar to an identification of block 505. For example, an added item can be identified based on input received at an electronic vendor device or by detecting a signal from an electronic user device.

In some instances, a substitution of items is identified. For example, for a particular order, a request can be received to substitute cheddar cheese for provolone cheese. A substitution of items can be identified in a manner similar to an identification of block 505. A substitution can be evaluated as both an exclusion item (to exclude the component typically included) and an added item (to add a substitute item).

In various instances, an added item, exclusion item and/or substitution of items may, or may not, correspond to a change in a price. For example, adding tomatoes to a pizza may not change a price of the pizza, while added chicken to a salad may increase a price of the sandwich. Whether an item addition, item exclusion and/or item substitution corresponds to a price change and/or is allowed can be determined, for example, based on a rule (e.g., a restaurant-specific rule or general rule), pricing scheme and/or menu.

At block 520, a per-item nutrition variable is identified for each of the identified one or more base items, added items and exclusion items. The per-item nutrition variable can be identified, for example, by looking up an identifier (e.g., name) of the item in a lookup data structure. In one instance, a nutrition variable for a base item can be identified by identifying a set of components (e.g., ingredients) in the base item, and combining (e.g., summing) nutrition variables for each component. In these instances, when an item is to be excluded from a base item, the combination can be performed accordingly to not combine one or more nutrition variables corresponding to the excluded item with other component nutrition variables.

In some instances, identifying a nutrition variable includes identifying a quantity of an item to be added, a quantity of an item to be excluded, a quantity of a base item and/or a quantity of a component in a base item. For example, to identify a nutrition variable for an excluded cheese item, an electronic vendor device can look up a calorie count per gram of cheese and multiply this amount with the number of grams of cheese typically included in a base item. Quantities can be determined, for example, based on a menu, nutrition data structure (e.g., a general one or one particular to an eatery) and/or recipe (e.g., general one or one particular to an eatery). For example, for a particular restaurant chain, a recipe can indicate that pizzas are to include 300 g pizza dough, 200 g pizza sauce, 1½ cup mozzarella cheese and ½ cup of each topping. A menu can then identify 5 specialty pizzas, one of which is a Hawaiian pizza including ham and pineapple toppings. Thus, when the Hawaiian pizza is included in an order, a nutrition variable for the pizza can be identified as identifying nutrition variables for recipe-identified quantities of pizza dough, pizza sauce and cheese and for ½ cup of each of ham and pineapple.

At block 525, a per-order nutrition variable can be identified based on the per-item nutrition variables. Some or all of the per-item nutrition variables associated with an order can be combined to produce the per-order nutrition variable. In one instance, nutrition variables for all identified base items and added items can be summed, and a nutrition variable for each exclusion item can be subtracted from the total.

At block 530, an RFID tag can be encoded to store data that includes one or more of the per-item nutrition variables (e.g., of a base item, an added item, an excluded item, a base item with an added item and/or base item without an excluded item) and/or per-order nutrition variable. The data can, in some instances, also include an identification of one or more base, added and/or exclusion items, a per-item and/or per-order price; a date and/or time of an order; a location of an order; a vendor name (e.g., restaurant or restaurant employee); and/or a customer name. The encoded data can identify an app to receive and/or process some or all of the data (e.g., at an electronic user device) and/or one or more actions (e.g., updating of a cumulative nutrition variable) to be performed (e.g., at an electronic user device) in response to receipt of the data.

In some instances, the electronic vendor device can cause the data to be locked to prevent or restrict modification. In some instances, one or more NFC Data Encoding Function (NDEF) payloads can be generated to include the data (e.g., within one or more records of a message of the NDEF message). The message can also include, for example, a header corresponding to each of the one or more payloads.

It will be appreciated that process 500 is illustrative and that various modifications are contemplated. For example, some orders may not include added items and/or exclusion items. In such instances, corresponding block 515 and/or block 510 can be excluded from process 500. As another example, block 525 can be excluded from process 500.

Figure 6:
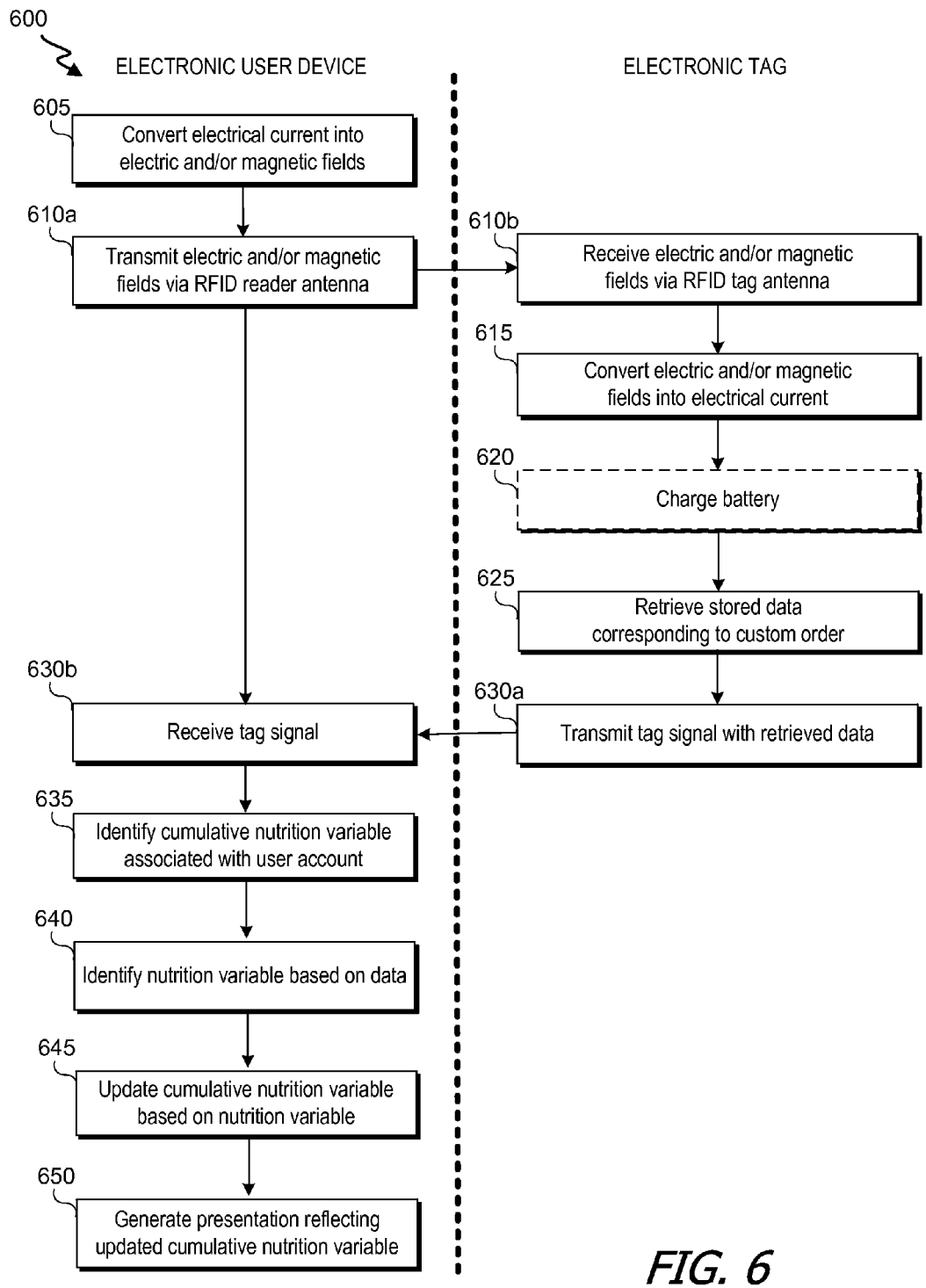
FIG. 6 is a flow diagram of a process for a communication between an electronic tag and electronic user device that corresponds to a custom food order according to an embodiment of the invention.

FIG. 6 is a flow diagram of a process 600 for a communication between an electronic tag and electronic user device that corresponds to a custom food order according to an embodiment of the invention. Part of process 600 can be performed, for example, by an electronic user device, such as electronic user device 130 or electronic user device 400. Part of process 600 can be performed, for example, by an electronic tag, such as electronic tag 120 or electronic tag 300. In some instances, execution of nutrition tracking app 438 causes one or more processors of the electronic user device to perform one or more actions in process 600.

At block 605, an electronic user device can convert electrical current into electric and/or magnetic fields. For example, an oscillating electric current can be provided to an antenna (e.g., an RFID reader antenna) such that magnetic and/or electric fields are produced around antenna elements. In some instances, process 600 utilizes NFC, and block 605 produces a magnetic field. In some instances, an electromagnetic field is generated.

At block 610a, the electronic user device can transmit (e.g., radiate) the electric and/or magnetic fields (e.g., via an antenna). At block 610b, the electronic tag can receive (e.g., intercept) the electrical and/or magnetic fields (e.g., via an antenna, such as an RFID tag antenna).

At block 615, the electronic tag can convert the electric and/or magnetic fields back into electrical current. For example, the waves can exert force on electronics in antenna elements to produce oscillating currents.

In some instances, the electronic tag can be an active tag that includes a battery. At least part of the electrical current can then be used to partly or fully charge the battery. In some instances, the electronic tag can be a passive tag without a battery, and block 620 can be omitted from process 600.

The electrical current can be used to perform one or more other actions (e.g., via direct use of the current or via a battery having been charged by the current), such as one or more of those in blocks 625-650. One action can include, at block 625, the electronic tag can retrieve stored data, which can include data locally stored in a memory of the electronic tag. The stored data can include, for example, data stored at the tag in response to an encoding process, such as that performed at block 530 of process 500. The stored data can correspond to a custom order. In some instances, the stored data can include one or more (e.g., per-item or per-order) nutrition variables, which can identify a quantity (for example) of calories, fat units, sodium units, sugar units, vitamin units, mineral units, protein units and/or diet-related allocation units. In some instances, the stored data can include an identification of each of one or more items (e.g., ordered base menu items, added items and/or excluded items).

The data can relate to an item accompanying the electronic tag and/or a purchase. For example, the electronic tag can be configured to be positioned on (e.g., stuck to), included in and/or connected to packaging of a product. The packaging can include, for example, a container, box, plastic cover, cup, or lid. The packaging can at least partly or fully enclose a product, such as a food item or drink item, and the data can correspond to at least part of the partly or fully enclosed item. The data can include information pertaining to the item, such as one or more nutrition variables of the item, a name of the item, a price of the item, a recipe for the item and/or one or more user reviews. The data can also include an identification of an app to which to avail part or all of the data.

At block 630a, a tag signal can be transmitted that includes the retrieved data, and at block 630b, the tag signal can be received at the electronic user device. Block 630a can include, for example, modulating an existing field provided by the electronic user device (e.g., that provided at block 610a) or by generating a new field corresponding to the data. In the latter instance, the electronic user device can alternate between supplying and receiving electric and/or magnetic fields. The communication of blocks 630a-b can occur, for example, via NFC, a short-range network, using Bluetooth Low Energy, using Bluetooth, wirelessly and/or using a same communication protocol as used in blocks 610a-b.

At block 635, the electronic user device can identify one or more cumulative nutrition variables. Block 635 can include retrieving one or more values from a local or remote storage. A cumulative nutrition variable can include a current quantity or count that is tracked, adjusted or incremented throughout a time period, such as a period of the day, a day or a week. In some instances, a cumulative nutrition variable can include a budgeted variable. For example, the variable can reflect a number of calories remaining in a daily target calorie budget of 1700 calories, and thus, the variable can decrease throughout the day.

A cumulative nutrition variable can include, correspond to or be influenced by a quantity (for example) of calories, fat units, sodium units, sugar units, vitamin units, mineral units, protein units and/or diet-related allocation units. For example, a cumulative nutrition variable can include a number of calories consumed throughout a present day. In some instances, a cumulative nutrition variable can also be dynamically influenced by one or more non-nutrition factors, such as user-identified or automatically detected exercise.

Each of the one or more cumulative nutrition variables can be associated with a user account. For example, a cumulative nutrition variable can be locally stored at the electronic user device, and data stored at the device can be explicitly or inherently associated with a corresponding user account. As another example, a cumulative nutrition variable can be alternatively or additionally stored remotely and can be stored in association with an identifier of a user, user account or electronic user device (e.g., such that the user device can retrieve it or request that it be updated).

At block 640, one or more nutrition variables can be identified based on the data. The one or more nutrition variables can include, for example, a per-item, per-order or per-meal nutrition variable. In some instances, a nutrition variable identified at block 640 can be of a same type as a cumulative nutrition variable identified at block 635 (e.g., each relating to calorie quantities). In some instances, a nutrition variable identified at block 640 can be of a different type as a cumulative nutrition variable identified at block 635 (e.g., the cumulative nutrition variable reflecting a number of diet points and the nutrition variable including a calorie quantity).

In one instance, the data in the tag signal includes the one or more nutrition variables. In one instance, the data in the tag signal includes other information that can be used by the electronic user device to determine the one or more nutrition variables. For example, the data can identify a particular menu item (e.g., Sandwich #6, Extra mayonnaise), food types (e.g., small cheese pizza) and/or a quantity of an item and/or ingredients in an item. The electronic user device can use this information and, for example, a local or remote lookup table to identify one or more nutrition variables for the identified items and/or ingredients.

The one or more nutrition variables can correspond to items involved in a custom order, such as a base menu item ordered, an item to be (or that was) added to the base menu item and/or an item to be (or that was) excluded to the base menu item. Thus, in various instances, the nutrition variable(s) identified at block 640 can correspond to food items for which it is estimated that a user has or will consumed; or at least one identified nutrition variable can correspond to a food for which it is estimated that a user has not or will not consume.

At block 645, the one or more cumulative nutrition variables can be updated based on the one or more nutrition variables. In some instances, one or more nutrition variables identified at block 640 (e.g., a per-item calorie count) can be combined with a corresponding cumulative nutrition variable. The combination can include, for example, a weighted or unweighted summation of one or more variables. In some instances, one or more first nutrition variables (e.g., corresponding to a base menu item or added item) are added to a corresponding cumulative nutrition variable and one or more second nutrition variables (e.g., corresponding to one or more excluded items) is subtracted from the sum.

In one instance, a cumulative nutrition variable relates to a foods estimated to have been consumed within a recent time period, such as the last 6 or 24 hours. Thus, block 645 can include, for example, updating the cumulative nutrition variable based on recently identified nutrition variable and reducing or removing influence of older nutrition variables on the cumulative nutrition variables. For example, the electronic user device can store a set of nutrition variables, each being associated with a time stamp (e.g., as identified in the tag signal or a time of receipt of the tag signal). Block 645 can include, for example, adding one or more new nutrition variables to a cumulative nutrition variable and subtracting one or more old nutrition variables (e.g., being associated with time stamps preceding a threshold) from the sum. As another example, block 645 can include generating an updated cumulative nutrition variable by identifying and summing all nutrition variables associated with a time stamp in a prescribed time period.

In some instances, a conversion technique can be applied to the nutrition variable before combining it with a cumulative nutrition variable. For example, one or more nutrition variables having one or more first units can be converted to another nutrition variable having second units. To illustrate a calorie nutrition variable and fat nutrition variable can be converted into a diet-point nutrition variable using a defined algorithm. As another illustration, a carbohydrate nutrition variable can be converted into a glycemic load nutrition variable using a conversion protocol and a glycemic load of an item (e.g., which can be identified in the data and/or locally or remotely looked up by the electronic user device).

At block 650, a presentation can be generated and, in some instances, presented at the electronic user device and/or transmitted to another device. The presentation can identify the updated cumulative nutrition variable and/or the identified one or more nutrition variables. In some instances, the presentation can also identify a target nutrition variable and/or a differential between the target nutrition variable and the updated nutrition variable. The presentation can also include names of food items and/or temporal data (e.g., indicating how many calories were consumed in each of a set of time periods). The presentation can include an assessment of food choices. For example, representations of food items associated with nutrition variables above a defined threshold can be colored in red or separately or selectively presented.

The presentation can be presented, for example, on a display of the electronic user device automatically (e.g., in response to receiving the tag signal) or in response to receipt of a presentation-request input. In some instances, the presentation can be dynamic. For example, in response to a user selection of a representation of a food item, the presentation can be updated to identify an assessment of a choice to consume the food item (e.g., "Good choice", "Splurge item") and/or an alternative to the food item (e.g., "Next time, choose a grilled chicken sandwich instead of fried chicken sandwich").

It will be appreciated that process 600 is illustrative, and various modifications are contemplated. For example, process 600 can include an additional action of storing part or all of the data in the tag signal, the identified one or more nutrition variables and/or the updated one or more cumulative nutrition variables at the electronic user device. As another example, process 600 can include an additional action of transmitting part or all of the data in the tag signal, the identified one or more nutrition variables and/or the updated one or more cumulative nutrition variable to another device (e.g., a remote server). In some instances, one or more actions shown in FIG. 6 can be performed by another device, such as a remote server. For example, the electronic user device can transmit some or all of the data in the tag signal to a remote server, and the remote server can perform some or all of blocks 635-650. The remote server can the transmit a signal back to the electronic user device (e.g., automatically or upon request) that includes the identified one or more nutrition variables, updated one or more cumulative nutrition variables and/or presentation. In some instances, blocks 605-620 can be omitted from process 600.

Thus, embodiments of the present invention can provide a variety of techniques for using electronic tags to communicate nutritional information about particular orders. This capability can facilitate tracking of nutritional information at an individual level in several ways. The custom data can increase convenience of nutritional tracking by reducing a need for a user to himself consult an overly inclusive nutrition data structure to identify pertinent data. To illustrate, a restaurant may publish a table of nutritional facts that identifies 6 or more nutritional variables for each menu item. The table can thus include several hundred or more values. A user may have only ordered two or three menu items and may only be interested in one type of variable (e.g., calories) but may nonetheless need to scan through all of the other data that is irrelevant to him to identify the values of interest. An automated technique for selectively encoding order-specific nutrition data in an electronic tag can efficiently provide pertinent information to a user via an electronic user device.

Further, static nutritional tables frequently do not include information about all of the many potential custom orders. Thus, if a user orders a base menu item with an addition, exclusion or substitution, the user may be unable to identify nutrition variables for the ordered modified item. Meanwhile, embodiments herein can be used to estimate nutrition variables even for modified items. For example, vendors or restaurants can provide nutrition information for various ingredients that may be added to or excluded from menu items, vendors or restaurants can provide quantities of ingredients that may be added to or excluded from menu items (e.g., and corresponding nutrition variables can be identified by an electronic vendor or user device) or nutrition variables for ingredients that may be added to or excluded from menu items can be estimated (e.g., based on an estimated ingredient quantity). Thus, users can be provided with nutrition information that more accurately relates to ordered and consumed food items.

Further yet, use of the electronic tags can facilitate more reliable tracking of nutrition variables. Manually tracking nutrition variables (e.g., by identifying consumed foods or by manually looking up relevant nutrition facts) can be time-consuming and can thus discourage users from consistently participating in the tracking process. The reduced necessity of front-end user involvement can encourage more reliable tracking, and in some instances, an electronic user device can receive nutrition data from an electronic tag without requiring any corresponding user input.

It will be appreciated that various modifications from the disclosures presented herein are contemplated. In some instances, while some disclosures herein relate to encoding information about food items (e.g., nutrition variables) at an electronic tag and using the tag data to update cumulative nutrition variables at electronic user devices, it will be appreciated that the disclosures can be expanded to other contexts. For example, disclosures can expanded to additionally or alternatively pertain to beverages (e.g., by encoding an electronic tag with information about a beverage item, such as a nutrition variable for the beverage item or identification of the beverage item, and using the tag data to update a cumulative nutrition variable at an electronic user device). As another example, disclosures can expanded to additionally or alternatively reward systems. To illustrate, an electronic tag can be encoded with data that identifies a type or quantity of reward units for a purchase (or identifies a purchased item such that a type or quantity of reward units can be identified at an electronic user device), and an electronic user device can receive the data and update an account to reflect the reward unit quantities (e.g., such that it can subsequently be used for a discount, free item or special offering).

Embodiments of the present invention, e.g., in methods, apparatus, computer readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method for encoding radio frequency identification (RFID) electronic tags to represent custom-order nutrition variables, the method comprising:
   identifying, at an electronic vendor device, a custom food order, the custom food order including a modified first food item, the modified first food item including a modified amount of a second food item included in the first food item;
   identifying a first nutrition variable for the first food item;
   identifying a second nutrition variable for the second food item,
   determining, at the electronic vendor device and using one or more processors, a nutrition variable based on the custom food order, the determining the nutrition variable including:
   adding the second nutrition variable to the first nutrition variable; or
   subtracting the second nutrition variable from the first nutrition variable; and
   encoding, at the electronic vendor device, an RFID electronic tag to store the nutritional variable.

2. The method of claim 1, wherein:
   the modified first food item includes an addition of the second food item to the first food item; and
   determining the nutrition variable includes adding the first nutrition variable to the second nutrition variable.

3. The method of claim 1, wherein:
   the second food item is to be excluded from the modified first food item; and
   determining the nutrition variable includes subtracting the second nutrition variable from the first nutrition variable.

4. The method of claim 1, further comprising:
   encoding the RFID electronic tag to store an identification of each of a plurality of food items in the custom food order.

5. The method of claim 1, wherein the RFID electronic tag includes a near-field communication (NFC) tag.

6. The method of claim 1, wherein the nutritional variable includes a quantity of calories.

7. An electronic vendor device comprising:
   one or more processors; and
   a non-transitory computer-readable storage medium containing instructions, that, when executed by the one or more processors, cause the one or more processors to perform actions including:
   identifying, at an electronic vendor device, a custom food order, the custom food order including a modified first food item, the modified first food item including a modified amount of a second food item included in the first food item;
   identifying a first nutrition variable for the first food item;
   identifying a second nutrition variable for the second food item,
   determining, at the electronic vendor device and using one or more processors, a nutrition variable based on the custom food order, the determining the nutrition variable including:
   adding the second nutrition variable to the first nutrition variable; or
   subtracting the second nutrition variable from the first nutrition variable; and
   encoding, at the electronic vendor device, an RFID electronic tag to store the nutritional variable.

8. The electronic vendor device of claim 7, wherein:
   the modified first food item includes an addition of the second food item to the first food item; and
   determining the nutrition variable includes adding the first nutrition variable to the second nutrition variable.

9. The electronic vendor device of claim 7, wherein:
   the second food item is to be excluded from the modified first food item; and
   determining the nutrition variable includes subtracting the second nutrition variable from the first nutrition variable.

10. The electronic vendor device of claim 7, wherein the actions further include:
    encoding the RFID electronic tag to store an identification of each of a plurality of food items in the custom food order.

11. The electronic vendor device of claim 7, wherein the RFID electronic tag includes a near-field communication (NFC) tag.

12. A computer-implemented method for using communications from RFID electronic tags to dynamically update cumulative nutrition variables, the method comprising:
    identifying, at an electronic user device, a cumulative nutrition variable associated with a user account;
    receiving, at the electronic user device and using RFID, data from an electronic tag, wherein the data includes information about a custom food order, the custom food order including a modified first food item, the modified first food item including a modified amount of a second food item included in the first food item;
    identifying, using one or more processors, a nutrition variable based on the data, wherein the nutrition variable reflects a nutrition characteristic of the custom food order;

updating, at the electronic user device, the cumulative nutrition variable based on the nutrition variable; and generating a presentation reflecting the updated cumulative nutrition variable.

13. The method of claim 12, wherein the data includes the nutrition variable.

14. The method of claim 12, wherein the modified first food item includes an addition of the second food item to the first food item, and wherein the method further comprises:

identifying a first nutrition variable for the first food item; and identifying a second nutrition variable for the second food item, wherein identifying the nutrition variable includes adding the first nutrition variable to the second nutrition variable.

15. The method of claim 12, wherein the second food item is to be excluded from the modified first food item, and wherein the method further comprises:

identifying a first nutrition variable for the first food item; and identifying a second nutrition variable for the second food item, wherein identifying the nutrition variable includes subtracting the second nutrition variable from the first nutrition variable.

16. The method of claim 12, wherein the electronic tag includes a near-field communication (NFC) tag.

17. The method of claim 12, wherein the nutritional variable includes a quantity of calories.

18. A electronic user device comprising:

one or more processors; and a non-transitory computer-readable storage medium containing instructions, that, when executed by the one or more processors, cause the one or more processors to perform actions including:

identifying, at the electronic user device, a cumulative nutrition variable associated with a user account;

detecting data in an RFID signal received at the electronic user device from an electronic tag, wherein the data includes information about a custom food order, the custom food order including a modified first food item, the modified first food item including a modified amount of a second food item included in the first food item;

identifying a nutrition variable based on the data, wherein the nutrition variable reflects a nutrition characteristic of the custom food order;

updating, at the electronic user device, the cumulative nutrition variable based on the nutrition variable; and generating a presentation reflecting the updated cumulative nutrition variable.

19. The electronic user device of claim 18, wherein the data includes the nutrition variable.

20. The electronic user device of claim 18, wherein the modified first food item includes an addition of the second food item to the first food item, and wherein the actions further include:

identifying a first nutrition variable for the first food item; and identifying a second nutrition variable for the second food item, wherein identifying the nutrition variable includes adding the first nutrition variable to the second nutrition variable.

21. The electronic user device of claim 18, wherein the second food item is to be excluded from the modified first food item, and wherein the actions further include:

identifying a first nutrition variable for the first food item; and identifying a second nutrition variable for the second food item, wherein identifying the nutrition variable includes subtracting the second nutrition variable from the first nutrition variable.

22. The electronic user device of claim 18, wherein the electronic tag includes a near-field communication (NFC) tag.

23. The electronic user device of claim 18, wherein the nutritional variable includes a quantity of calories.

* * * * *